US009979035B2

(12) United States Patent
Matsusue

(10) Patent No.: US 9,979,035 B2
(45) Date of Patent: May 22, 2018

(54) FUEL CELL SYSTEM

(71) Applicant: TOYOTA JIDOSHA KABUSHIKI KAISHA, Toyota-shi, Aichi-ken (JP)

(72) Inventor: Masaaki Matsusue, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/216,250

(22) Filed: Jul. 21, 2016

(65) Prior Publication Data

US 2017/0025689 A1    Jan. 26, 2017

(30) Foreign Application Priority Data

Jul. 23, 2015  (JP) ................. 2015-146198

(51) Int. Cl.
| | |
|---|---|
| H01M 8/04858 | (2016.01) |
| H01M 16/00 | (2006.01) |
| H01M 8/04537 | (2016.01) |
| H01M 8/0438 | (2016.01) |
| H01M 8/04992 | (2016.01) |
| H01M 8/0432 | (2016.01) |
| H01M 8/1018 | (2016.01) |

(52) U.S. Cl.
CPC ....... *H01M 8/0488* (2013.01); *H01M 8/0441* (2013.01); *H01M 8/0491* (2013.01); *H01M 8/04559* (2013.01); *H01M 8/04574* (2013.01); *H01M 8/04589* (2013.01); *H01M 8/04992* (2013.01); *H01M 16/006* (2013.01); *H01M 8/0432* (2013.01); *H01M 2008/1095* (2013.01); *H01M 2220/20* (2013.01); *H01M 2250/20* (2013.01); *Y02T 90/32* (2013.01)

(58) Field of Classification Search
CPC ........... H01M 8/04992; H01M 8/0488; H01M 8/0441
See application file for complete search history.

(56) References Cited

U.S. PATENT DOCUMENTS

| | | |
|---|---|---|
| 2006/0278450 A1 | 12/2006 | Shirasaka et al. |
| 2008/0057364 A1 | 3/2008 | Yamaguchi |
| 2012/0019254 A1* | 1/2012 | Zhang ............... H01M 8/04552 324/434 |

(Continued)

FOREIGN PATENT DOCUMENTS

| | | |
|---|---|---|
| EP | 2988353 A1 | 2/2016 |
| JP | 2006-345651 A | 12/2006 |

(Continued)

*Primary Examiner* — Matthew J Merkling
(74) *Attorney, Agent, or Firm* — Hunton Andrews Kurth LLP

(57) ABSTRACT

A fuel cell system includes a fuel cell; and a control unit that is configured to set a target current value of the fuel cell based on an output request for the fuel cell, predict that a voltage drop of the fuel cell occurs in a high current region of the fuel cell, based on an output voltage value of the fuel cell in a low current region of the fuel cell, if an output current value of the fuel cell is in the low current region and the target current value is above a current threshold that is set in the high current region, reset the target current value to a current value that is smaller than the set target current value, if it is predicted that the voltage drop occurs, and change the output current value of the fuel cell to the reset target current value.

3 Claims, 10 Drawing Sheets

(56) References Cited

U.S. PATENT DOCUMENTS

| | | | |
|---|---|---|---|
| 2013/0330646 A1 | 12/2013 | Aoki | |
| 2014/0248548 A1* | 9/2014 | Kaneko | H01M 8/0488 429/432 |
| 2017/0005350 A1* | 1/2017 | Niroumand | H01M 8/04992 |

FOREIGN PATENT DOCUMENTS

| | | |
|---|---|---|
| JP | 2007-012438 A | 1/2007 |
| JP | 2009-016191 A | 1/2009 |
| JP | 2013-196782 A | 9/2013 |
| JP | 5522309 B2 | 6/2014 |
| WO | 2014171291 A1 | 10/2014 |

* cited by examiner

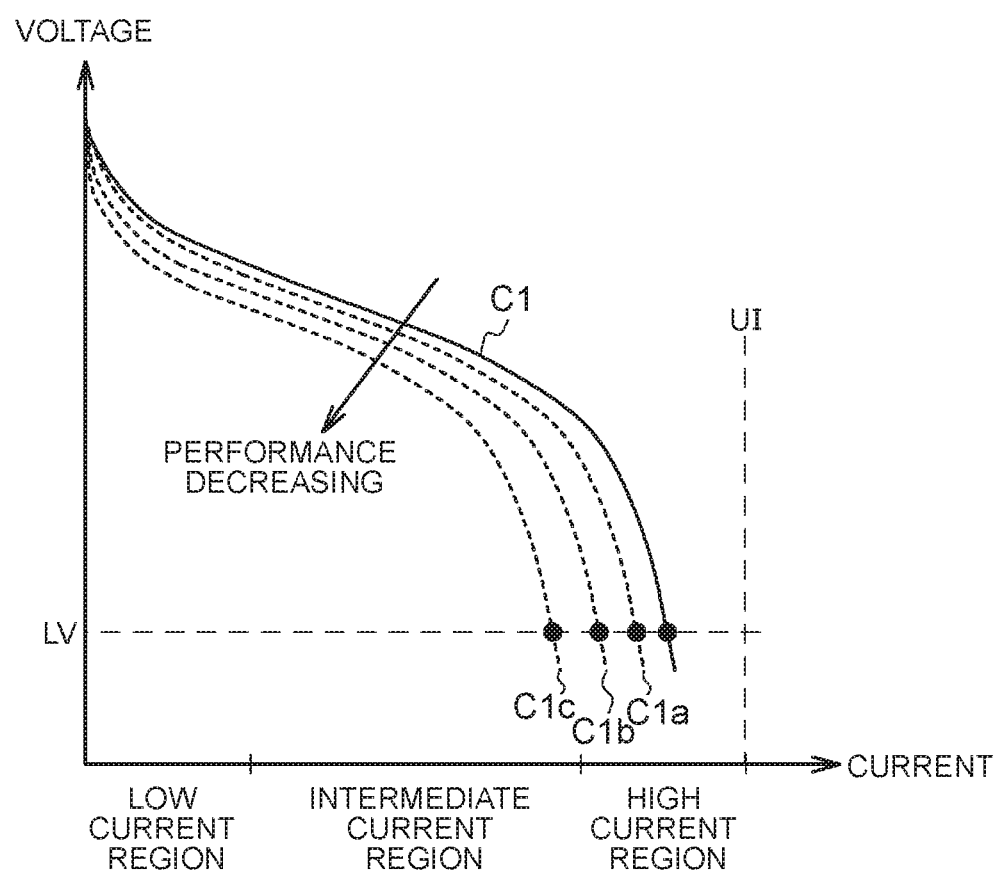

FUEL CELL SYSTEM

INCORPORATION BY REFERENCE

The disclosure of Japanese Patent Application No. 2015-146198 filed on Jul. 23, 2015 including the specification, drawings and abstract is incorporated herein by reference in its entirety.

BACKGROUND OF THE INVENTION

1. Field of the Invention

Embodiments of the invention relate to a fuel cell system.

2. Description of Related Art

In a fuel cell, flooding sometimes occurs so that the moisture in the fuel cell blocks poles in electrodes and flow channels of separators. If the fuel cell is in a flooding state, the output of the fuel cell may decrease due to the occurrence of an abrupt voltage drop in a high current region. As an art of suppressing the occurrence of such a voltage drop, for example, there is known a technology of resolving flooding by increasing the amount of cathode gas and hence promoting the drainage of water from a fuel cell (e.g., see Japanese Patent Application Publication No. 2013-196782 (JP 2013-196782 A)). There is also known a technology of suppressing the occurrence of a voltage drop by estimating a degree of decrease in voltage of a fuel cell corresponding to an operation state of a motor and limiting an output of the motor in accordance with the degree of decrease in voltage (e.g., see Japanese Patent Application Publication No. 2006-345651 (JP 2006-345651 A)).

However, according to the technology of resolving flooding by increasing the amount of cathode gas, a predetermined time is required from a request to increase the amount of cathode gas to the resolution of flooding. In consequence, for example, if a request to increase the output of the fuel cell is made in the flooding state, the operation state of the fuel cell shifts to the high current region to cause a voltage drop before the resolution of flooding, and as a result, the output of the fuel cell may decrease.

According to the technology of estimating the degree of decrease in voltage and limiting the output of the motor, the degree of decrease in voltage at present is estimated based on an actually measured output voltage value of the fuel cell at present. Therefore, for example, if the operation state of the fuel cell shifts from a low current region to the high current region in a short period, the estimation of the degree of decrease in voltage cannot cope with the shift in the operation state of the fuel cell. As a result, the degree of decrease in voltage exceeds a degree to which it should be limited, so a voltage drop may occur in the high current region. If so, the voltage may be controlled in such a manner as to return to a pre-voltage drop state, based on the later estimated degree of decrease in voltage, and the convergence performance of the output of the fuel cell may decrease.

SUMMARY

A fuel cell system that is designed to suppress the decrease in the output of a fuel cell and the decrease in the convergence performance of the output is provided.

Embodiments of the invention provide a fuel cell system comprising: a fuel cell; and a control unit that is configured to set a target current value of the fuel cell based on an output request for the fuel cell, predict that a voltage drop of the fuel cell occurs in a high current region of the fuel cell, based on an output voltage value of the fuel cell in a low current region of the fuel cell, if an output current value of the fuel cell is in the low current region and the target current value is above a current threshold that is set in the high current region, reset the target current value to a current value that is smaller than the set target current value, if it is predicted that the voltage drop occurs, and change the output current value of the fuel cell to the reset target current value.

The output voltage value of the fuel cell in the low current region is correlated with a humidity state of the fuel cell, and the humidity state is correlated with the occurrence of a voltage drop in the high current region. Therefore, the occurrence of a voltage drop in the high current region can be predicted in advance, based on the output voltage value of the fuel cell in the low current region. Accordingly, if it is predicted that a voltage drop occurs, the target current value is reset to the low current value. Therefore, the occurrence of a voltage drop is suppressed, and the decrease in the output of the fuel cell is suppressed. The occurrence of a voltage drop in the high current region is predicted in advance, so the occurrence of a voltage drop can be suppressed in advance. Therefore, even when the operation state of the fuel cell shifts from the low current region to the high current region in a short period, the decrease in the convergence performance of the output of the fuel cell is suppressed.

The control unit may predict that the voltage drop occurs if the output voltage value of the fuel cell at a predetermined current value in the low current region is above a voltage threshold. Thus, the voltage drop can be predicted by a simple method.

The control unit may be equipped with a storage unit. The current threshold and the voltage threshold are stored in the storage unit. The control unit may be configured to estimate a current-voltage characteristic of the fuel cell, determine, based on the estimated current-voltage characteristic, whether a performance of the fuel cell has decreased, update at least one of the current threshold and the voltage threshold that are stored in the storage unit, based on the estimated current-voltage characteristic, if it is determined that the performance of the fuel cell has decreased. Thus, the decrease in the output of the fuel cell and the decrease in the convergence performance of the output are suppressed in such a manner as to cope with the decrease in the performance of the fuel cell over time.

A fuel cell system that is designed to suppress the decrease in the output of a fuel cell and the decrease in the convergence performance of the output can be provided.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 10 is a map showing how a current-voltage characteristic curve changes as electric power generation performance of a fuel cell decreases.

DETAILED DESCRIPTION OF EMBODIMENTS

Figure 1:
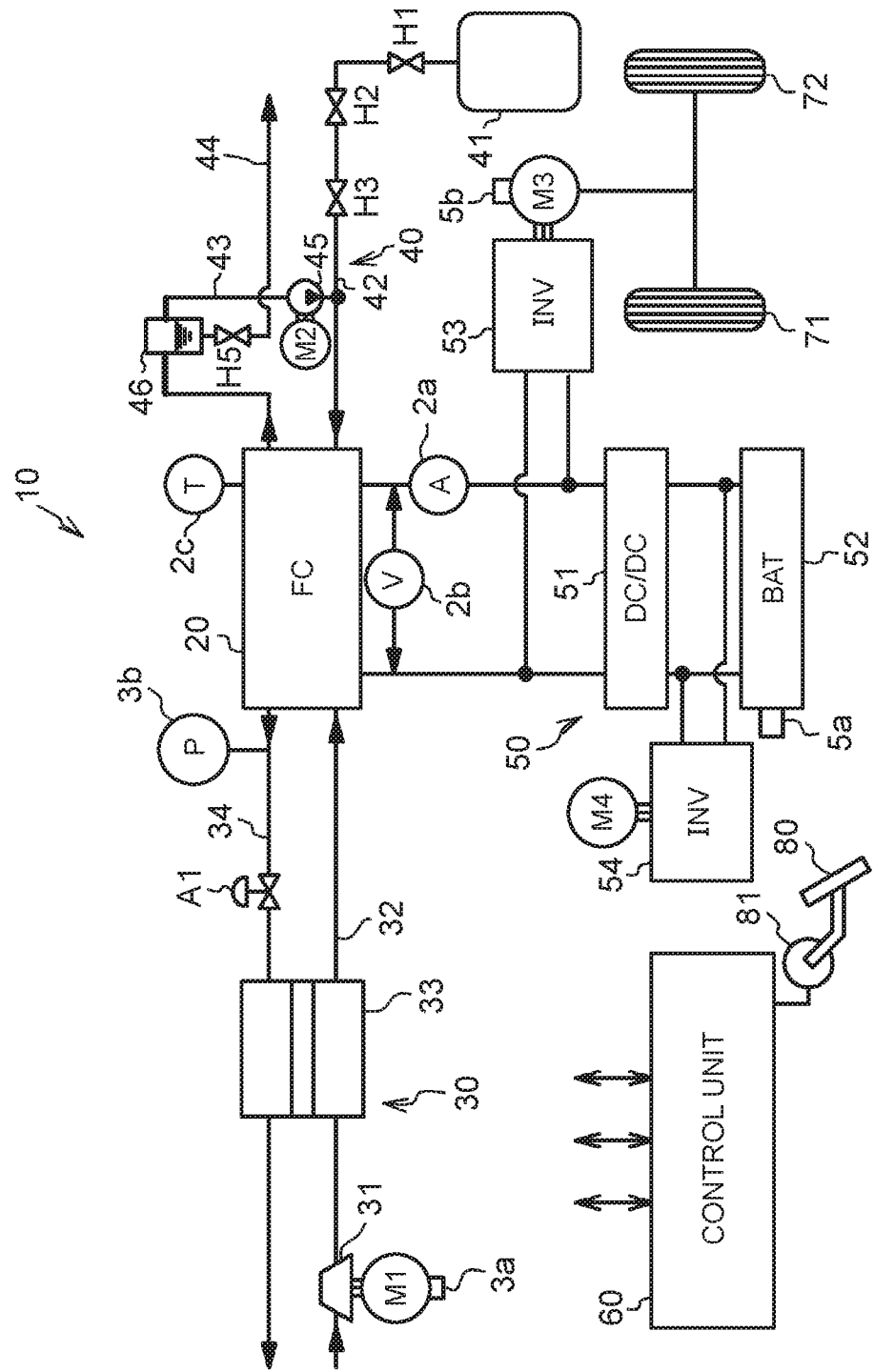
FIG. 1 is an illustrative view showing a configuration of a fuel cell system.

FIG. 1 is an illustrative view showing a configuration of a fuel cell system 10. This embodiment of the invention is an example in which the fuel cell system is applied to a vehicle. As shown in FIG. 1, the fuel cell system 10 includes a fuel cell stack (hereinafter referred to as a fuel cell) 20, an oxidant gas piping system 30, a fuel gas piping system 40, an electric power system 50 and a control unit 60. The fuel cell 20 is supplied with oxidant gas and fuel gas to generate electric power. The oxidant gas piping system 30 supplies the fuel cell 20 with air containing oxygen as oxidant gas. The fuel gas piping system 40 supplies the fuel cell 20 with hydrogen gas as fuel gas. The electric power system 50 charges and discharges the system. The control unit 60 generally controls the entire system.

The fuel cell 20 is of a solid polyelectrolyte type, and is equipped with a stack structure in which a multitude of single cells (cells) are stacked on one another. Each of the single cells of the fuel cell 20 has a cathode electrode (an air electrode) and an anode electrode (a fuel electrode). The cathode electrode is on one face of an ion-exchange membrane made of an electrolyte, and the anode electrode is on the other face thereof. For an electrode including the cathode electrode and the anode electrode, for example, platinum Pt is used as a catalyst (an electrode catalyst) with a porous carbon material serving as a base. A cathode-side gas diffusion layer is arranged on a surface of the cathode electrode. By the same token, an anode-side gas diffusion layer is arranged on a surface of the anode electrode. Furthermore, a pair of separators are provided in such a manner as to sandwich the cathode-side gas diffusion layer and the anode-side gas diffusion layer from both sides. Fuel gas is supplied to a fuel gas flow channel of one of the separators, and oxidant gas is supplied to an oxidant gas flow channel of the other separator, so the fuel cell 20 generates electric power.

The fuel cell 20 is fitted with a current sensor 2a that detects an output current, a voltage sensor 2b that detects an output voltage, and a temperature sensor 2c that detects a temperature of the fuel cell 20.

The oxidant gas piping system 30 has an air compressor 31, an oxidant gas supply channel 32, a humidification module 33, a cathode off-gas flow channel 34, and a motor M1 that drives the air compressor 31.

The air compressor 31 is driven by the motor M1, compresses air containing oxygen (oxidant gas) taken in from outside air, and supplies this oxidant gas to the cathode electrode of the fuel cell 20. The motor M1 is fitted with a rotational speed detection sensor 3a that detects a rotational speed thereof. The oxidant gas supply channel 32 serves to introduce the oxygen supplied from the air compressor 31, to the cathode electrode of the fuel cell 20. Cathode off-gas is discharged from the cathode electrode of the fuel cell 20 via the cathode off-gas flow channel 34.

The humidification module 33 exchanges moisture between low-humidity oxidant gas flowing through the oxidant gas supply channel 32, and high-humidity cathode off-gas flowing through the cathode off-gas flow channel 34, and appropriately humidifies the oxidant gas supplied to the fuel cell 20. The cathode off-gas flow channel 34 serves to discharge cathode off-gas to the outside of the system, and a back pressure adjusting valve A1 is disposed in the vicinity of an outlet of the cathode electrode. The pressure of the oxidant gas discharged from the fuel cell 20, namely, a cathode back pressure is adjusted by the back pressure adjusting valve A1. A pressure sensor 3b that detects the cathode back pressure is fitted between the fuel cell 20 and the back pressure adjusting valve A1 in the cathode off-gas flow channel 34.

The fuel gas piping system 40 has a fuel gas supply source 41, a fuel gas supply channel 42, a fuel gas circulation channel 43, an anode off-gas flow channel 44, a hydrogen circulation pump 45, a gas-liquid separator 46, and a motor M2 for driving the hydrogen circulation pump 45.

The fuel gas supply source 41 is a tank for supplying the fuel cell 20 with hydrogen gas as fuel gas. The fuel gas supply channel 42 serves to introduce the fuel gas discharged from the fuel gas supply source 41, to the anode electrode of the fuel cell 20. A tank valve H1, a hydrogen supply valve H2, and an FC inlet valve H3 are disposed in this order from an upstream side in the fuel gas supply channel 42. These valves are electromagnetic valves that supply fuel gas to the fuel cell 20 and stop the supply of fuel gas thereto.

The fuel gas circulation channel 43 serves to recirculate unreacted fuel gas to the fuel cell 20. The gas-liquid separator 46, the hydrogen circulation pump 45, and a check valve (not shown) are disposed in this order from the upstream side in the fuel gas circulation channel 43. The unreacted fuel gas discharged from the fuel cell 20 is appropriately pressurized by the hydrogen circulation pump 45, and is introduced to the fuel gas supply channel 42. Fuel gas is restrained from flowing backward from the fuel gas supply channel 42 to the fuel gas circulation channel 43, by the check valve. The anode off-gas flow channel 44 serves to discharge anode off-gas containing the hydrogen off-gas discharged from the fuel cell 20 and the water stored in the gas-liquid separator 46, to the outside of the system. An exhaust/drain valve H5 is disposed in the anode off-gas flow channel 44.

The electric power system 50 is equipped with a high-voltage DC/DC converter 51, a battery 52, a traction inverter 53, an auxiliary inverter 54, a traction motor M3, and an auxiliary motor M4.

The high-voltage DC/DC converter 51 can adjust a DC voltage from the battery 52 and output the adjusted DC voltage to the traction inverter 53 side. Also, the high-voltage DC/DC converter 51 can adjust a DC voltage from the fuel cell 20 or a voltage from the traction motor M3 that has been converted into a DC voltage by the traction inverter 53, and output the adjusted DC voltage to the battery 52. The output voltage of the fuel cell 20 is controlled by the high-voltage DC/DC converter 51.

The battery 52 is a rechargeable secondary battery, and can be charged with surplus electric power and supply supplementary electric power. The voltage of part of the DC electric power generated by the fuel cell 20 is boosted and lowered by the high-voltage DC/DC converter 51, and the battery 52 is charged therewith. The battery 52 is fitted with an SOC sensor 5a that detects a state of charge thereof.

The traction inverter 53 and the auxiliary inverter 54 convert a DC electric power output from the fuel cell 20 or the battery 52 into a three-phase AC electric power, and supply the traction motor M3 and the auxiliary motor M4 therewith. The traction motor M3 drives wheels 71 and 72. The traction motor M3 is fitted with a rotational speed detection sensor 5b that detects a rotational speed thereof. The auxiliary motor M4 is a motor for driving various auxiliaries, and is a general term for the motors M1 and M2.

The control unit 60 includes a CPU, a ROM and a RAM, and generally controls respective components of the system based on signals of respective sensors input to the control unit 60. In concrete terms, the control unit 60 determines whether there is an output request for the fuel cell 20, based on respective sensor signals delivered from an accelerator pedal sensor 81 that detects the turning of an accelerator pedal 80, the SOC sensor 5a and the rotational speed detection sensor 5b, and calculates a target output value. The control unit 60 sets a target current value of the fuel cell 20 based on a current-output curve (an IP curve) that will be described later.

The control unit 60 controls the fuel cell 20 from a low current region to a high current region such that this output current value is output. The control unit 60 controls the output pulses of the traction inverter 53 and the auxiliary inverter 54, and controls the traction motor M3, the auxiliary motor M4 and the like.

It should be noted herein that in a certain humidity state, the fuel cell 20 may not be able to output a desired required output due to a voltage drop resulting from an increase in gas diffusion resistance in the high current region. In the present embodiment of the invention, the control unit 60 performs voltage drop suppression control for suppressing the occurrence of a voltage drop of the fuel cell 20. The control unit 60 also performs update control in which a decrease in performance of the fuel cell 20 over time is taken into account. These kinds of control are performed by a setting unit, an output control unit, a prediction unit, a resetting unit, a storage unit, a characteristic estimation unit, a determination unit and an update unit, which are functionally realized by the CPU, the ROM and the RAM. Before describing these kinds of control, a current-voltage characteristic (an IV characteristic) of the fuel cell 20 and a voltage drop in the high current region will be described.

Figure 2:
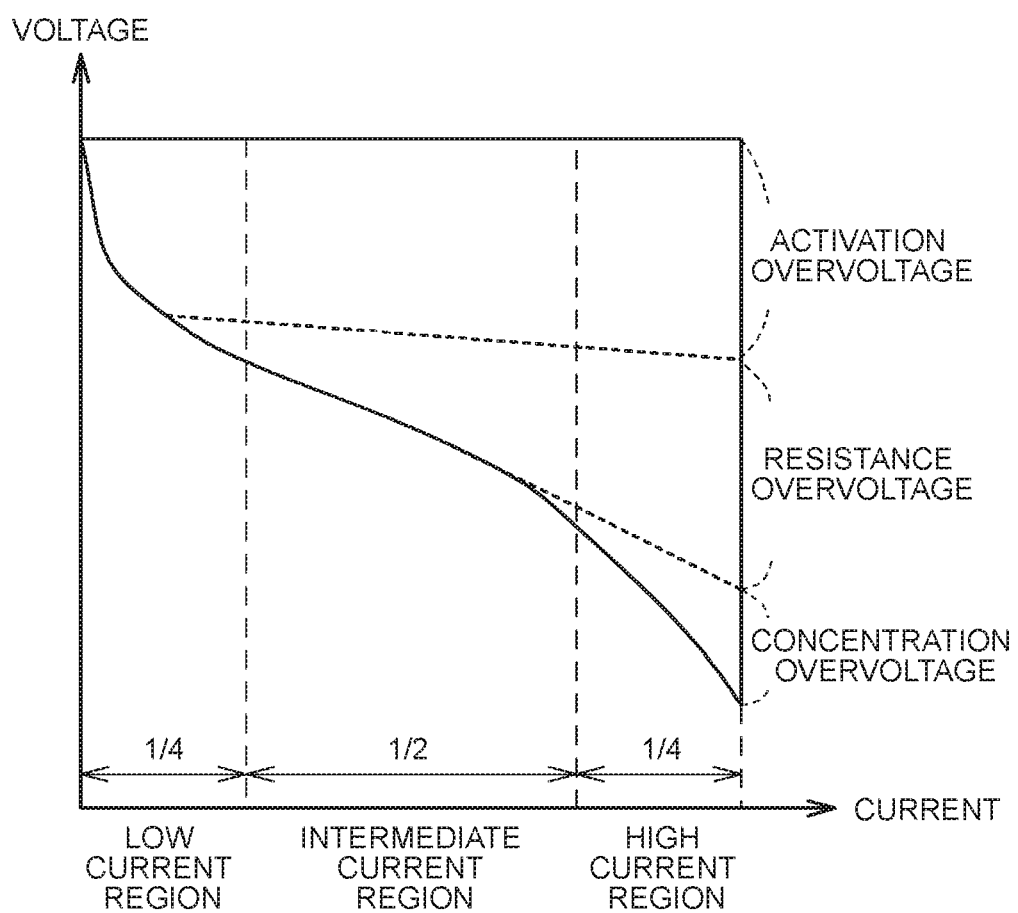
FIG. 2 is a graph for illustrating a current-voltage characteristic of a fuel cell.

FIG. 2 is a graph for illustrating the IV characteristic of the fuel cell 20. The output voltage of the fuel cell 20 decreases as the output current increases. The main factors in a decrease in the output voltage of the fuel cell 20 include an activation overvoltage, a resistance overvoltage and a concentration overvoltage. The activation overvoltage is a decrease in voltage resulting from the activation energy that is consumed in reducing oxygen at the cathode electrode. The resistance overvoltage is a decrease in voltage resulting from internal resistances of the electrolyte membranes, catalyst layers, the gas diffusion layers, the separators and current collectors in the fuel cell 20. The concentration overvoltage is a decrease in voltage resulting from an increase in gas diffusion resistance that is caused by the moisture supplied to the cells of the fuel cell 20 and the water produced in the cells. The voltage drop resulting from the activation overvoltage, the voltage drop resulting from the resistance overvoltage, and the voltage drop resulting from the concentration overvoltage will be referred to hereinafter as a first voltage drop, a second voltage drop and a third voltage drop respectively.

The activation overvoltage, the resistance overvoltage and the concentration overvoltage increase in a low current region, an intermediate current region and a high current region of the output current of the fuel cell 20 respectively. The low current region is a region in which the voltage decreases under the greatest influence of the activation overvoltage among the activation overvoltage, the resistance overvoltage and the concentration overvoltage. The intermediate current region is a region in which the voltage decreases under the greatest influence of the resistance overvoltage. The high current region is a region in which the voltage decreases under the greatest influence of the concentration overvoltage. For example, the low current region is a former-half region occupying about a quarter of the entire current region in which the fuel cell 20 can output current. The high current region is a latter-half region occupying about a quarter of the entire current region. The intermediate current region is a region occupying about a half of the entire current region with the low current region and the high current region excluded. As shown in FIG. 2, the voltage value is minimized in the high current region. Incidentally, the entire current region in which the fuel cell 20 can output current is reduced due to a decrease in the electric power generation performance of the fuel cell 20. The details will be described later.

Figure 3:
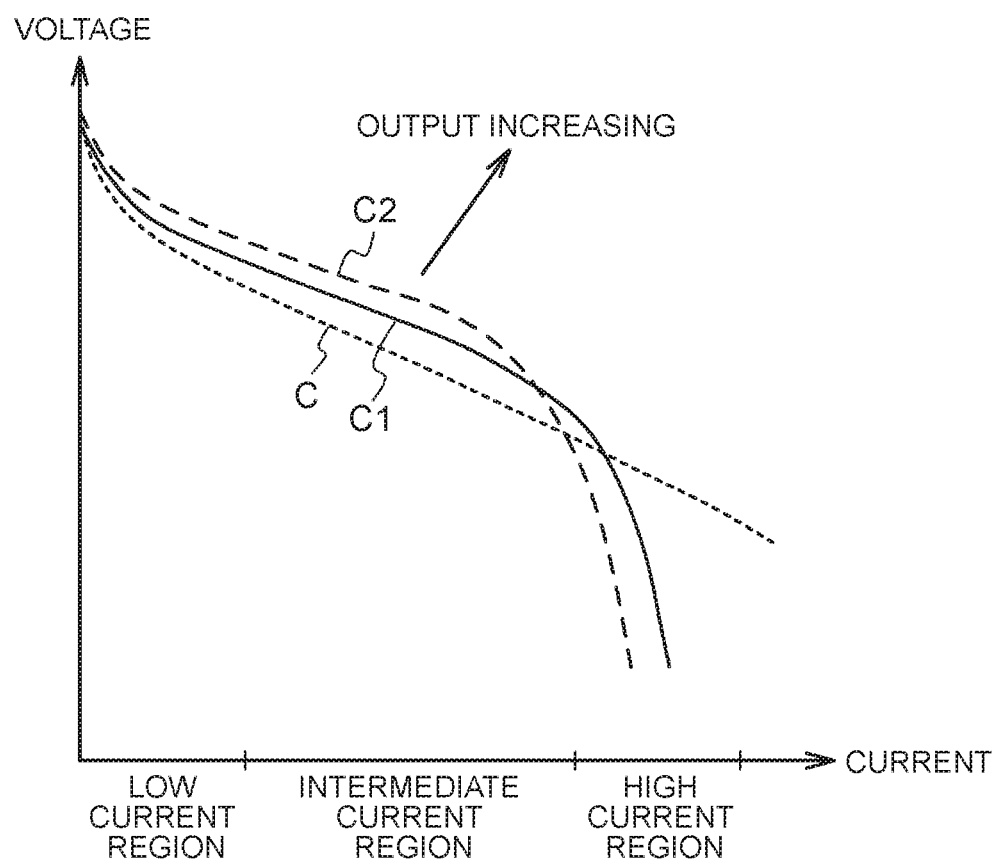
FIG. 3 is a map showing current-voltage characteristic curves.

Next, the voltage drop of the fuel cell 20 will be described. FIG. 3 is a map showing the current-voltage characteristic curves (the IV curves). A plurality of IV curves C to C2 are shown in FIG. 3. Each of the IV curves C to C2 is a line indicating the current-voltage characteristic (the IV characteristic) of the fuel cell 20 corresponding to the humidity state of the fuel cell 20. The map of FIG. 3 is calculated in advance through an experiment to be stored into the ROM. Incidentally, although only the IV curves C to C2 are shown in FIG. 3, a plurality of other IV curves may be stored in the ROM.

The IV curve C is an ideal IV curve on which the voltage drop (the third voltage drop) resulting from an increase in concentration overvoltage in the high current region does not occur even when a shift is made from the low current region to the high current region while the electrolyte membrane of the fuel cell 20 is in a humidity state of good humidity. Good humidity is a state where the electrolyte membrane is moderately humid, the proton shift resistance is small, and, e.g., flooding has not occurred. The IV curve C1 is an IV curve where the voltage drops if a shift is made from the low current region to the high current region in a high humidity state where the amount of moisture in the fuel cell 20 is large. The IV curve C2 is an IV curve where the voltage drastically drops in the high current region if a shift is made from the low current region to the high current region in an excessively humidified state where the amount of moisture in the fuel cell 20 is larger.

As shown in FIG. 3, in the low current region, the voltage values on the IV curves C1 and C2 are larger than the voltage value on the IV curve C. The reason for this is considered to consist in that as the amount of moisture in the fuel cell 20 increases, the amount of poisoning of the platinum catalyst of the cathode electrode decreases, the surface of platinum effective for a reduction reaction increases, the activation overvoltage decreases, and the output voltage increases. On the other hand, in the high current region, the voltage values on the IV curves C1 and C2 are smaller than the voltage value on the IV curve C. The reason for this is as follows. If the operation state shifts to the high current region in a state where the amount of moisture in the fuel cell 20 is large, a larger number of electrochemical reactions are required, and a large quantity of reactant gas is supplied into the fuel cell 20. On the other hand, the pores in the electrodes and the flow channels of the separators are partially blocked by water, so flooding occurs to hinder the diffusion and reaction of reactant gas. Consequently, the concentration overvoltage increases, and a voltage drop occurs. In particular, if the operation state of the fuel cell 20 shifts from the low current region to the high current region in a short period in the high humidity state or the excessively humidified state, the third voltage drop may occur due to a shift in the operation state of the fuel cell 20 to the high current region before the drainage of water from the fuel cell 20 is promoted. If the amount of platinum used as an electrode catalyst is reduced for the purpose of reducing the cost of manufacturing, the effective area of platinum is reduced through flooding, so there arises a situation where the third voltage drop is likely to occur. As described above, as the amount of moisture in the fuel cell 20 increases, the voltage value in the low current region increases, and the likelihood of the occurrence of the third voltage drop in the high current region increases. In other words, the voltage value in the low current region is correlated with the humidity state of the fuel cell 20, and the humidity state is correlated with the magnitude of the voltage drop in the high current region.

Figure 4:
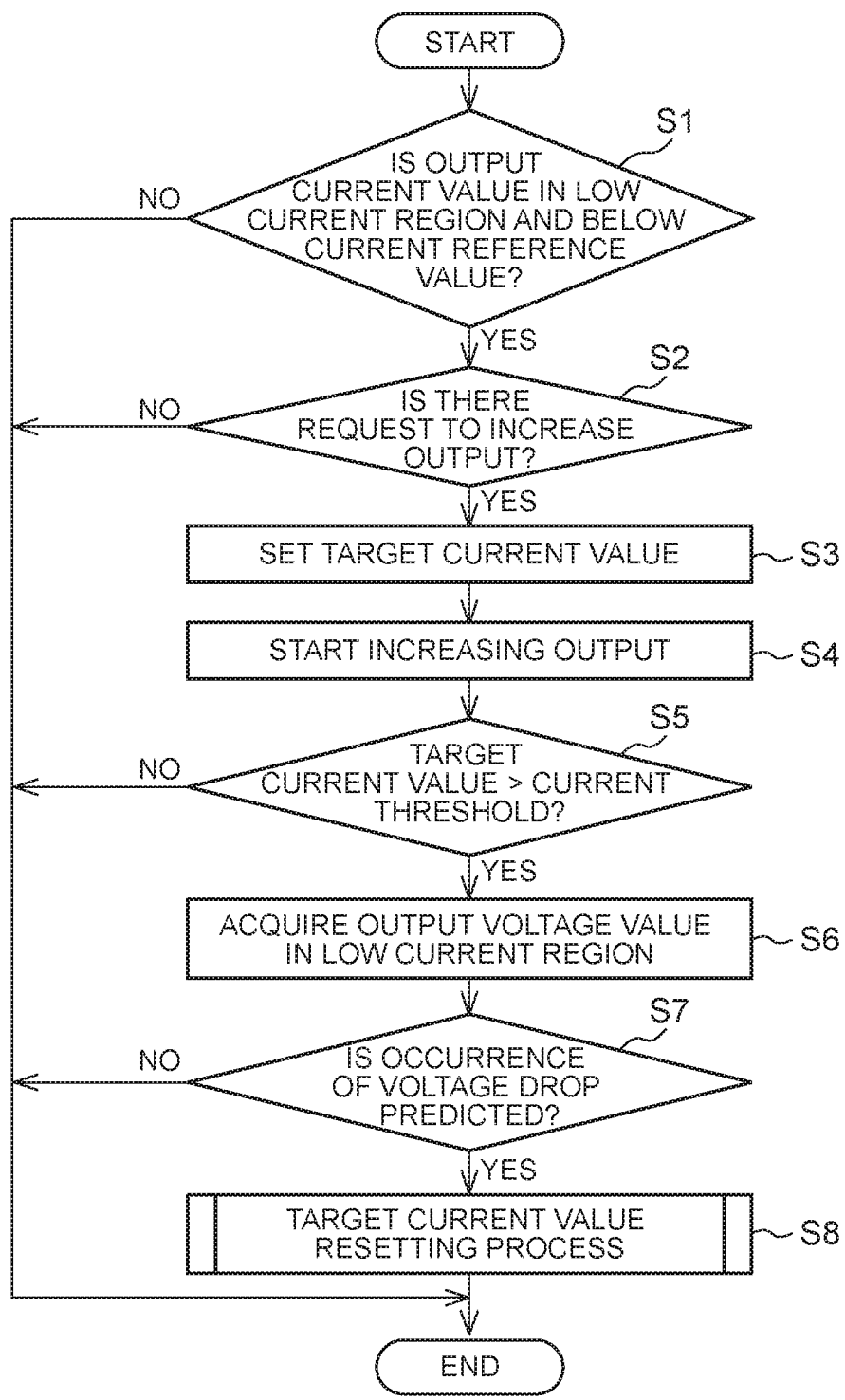
FIG. 4 is a flowchart showing an example of voltage drop suppression control.
Figure 5:
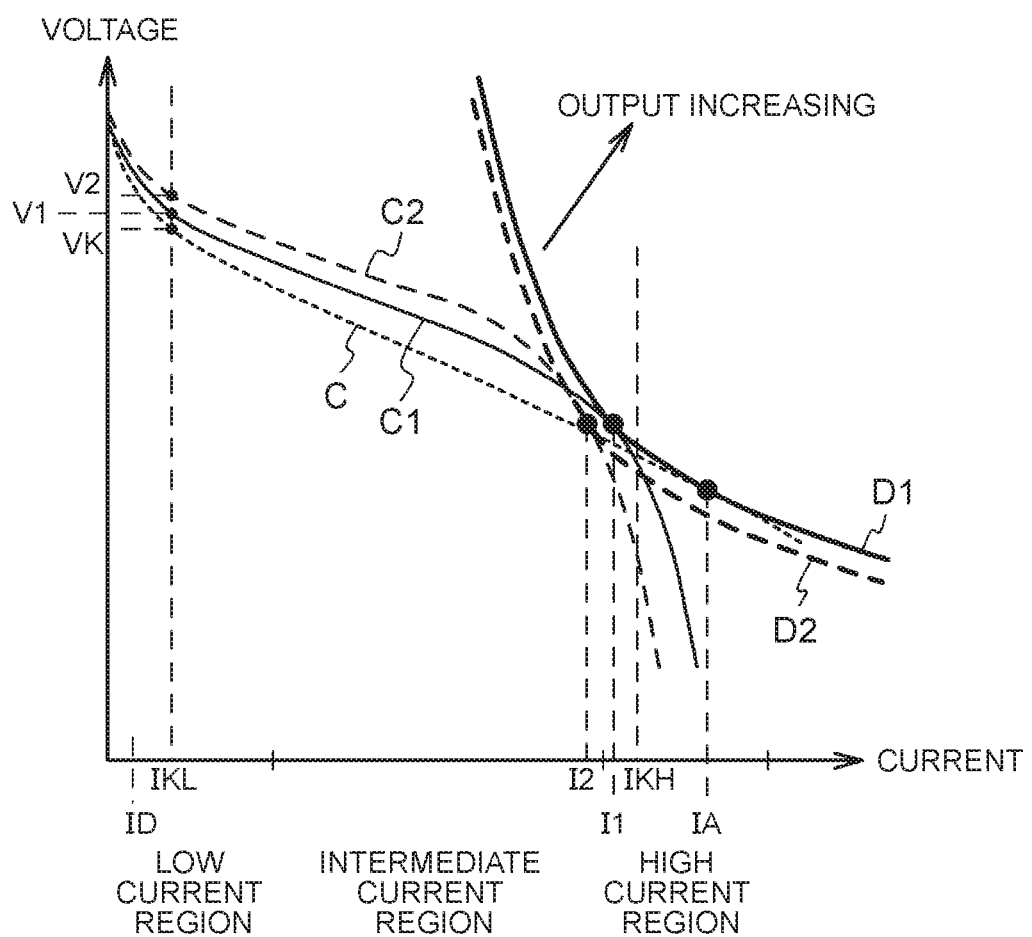
FIG. 5 is a map showing current-voltage characteristic curves and iso-output curves.
Figure 6:
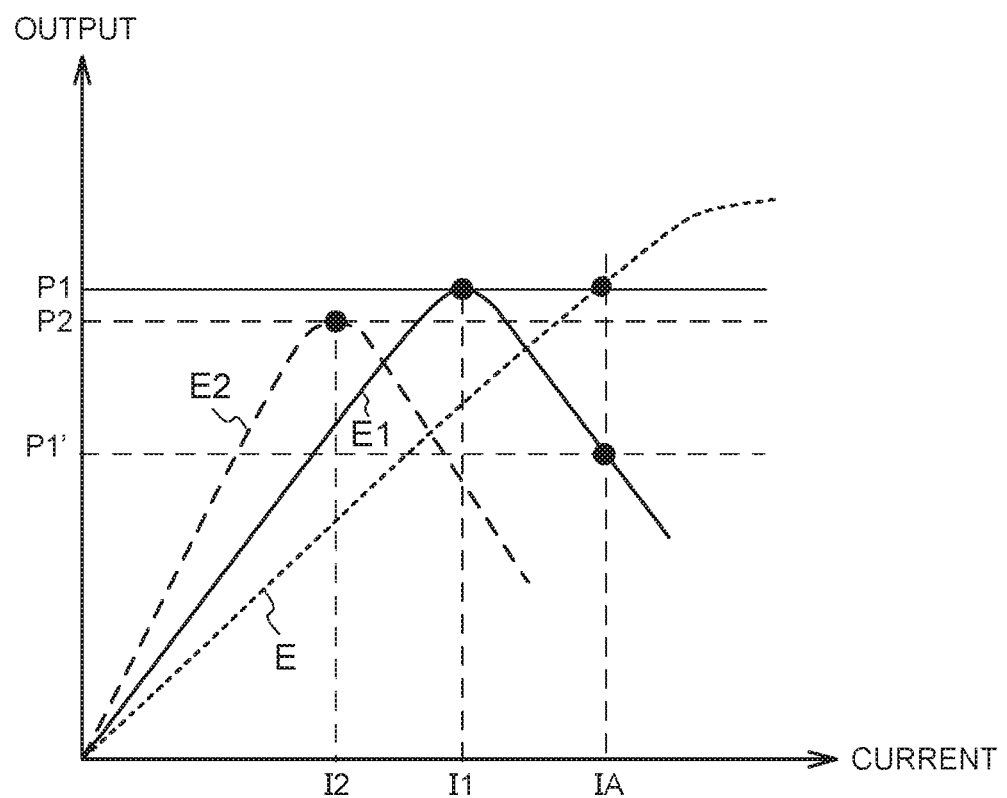
FIG. 6 is a map showing current-output characteristic curves.

Next, voltage drop suppression control for suppressing such a voltage drop in the high current region will be described. FIG. 4 is a flowchart showing an example of voltage drop suppression control performed by the control unit 60. FIG. 5 is a map showing the current-voltage characteristic curves and iso-output curves D1 and D2. FIG. 6 is a map showing current-output characteristic curves. Incidentally, each of IP curves E to E2 shown in FIG. 6 represents a relationship between the output current of the fuel cell 20 and the output electric power of the fuel cell 20 where the operation state of the fuel cell 20 shifts along a corresponding one of the IV curves C to C2. The maps shown in FIGS. 5 and 6 are calculated in advance through an experiment to be stored into the ROM. Incidentally, although only the IP curves E to E2 are shown in FIG. 6, a plurality of other IP curves may be stored in the ROM. These IP curves are associated with the IV curves respectively and stored in the ROM.

Voltage drop suppression control is repeatedly performed at intervals of a predetermined time. First of all, the control unit 60 determines, based on an output value from the current sensor 2a, whether the output current value of the fuel cell 20 is in the low current region and below a current reference value IKL (step S1). The current reference value IKL is a predetermined current value in the low current region, and is set to a value that is larger than an output current value ID in an idling operation state of the fuel cell 20. If the result of the determination is affirmative, the control unit 60 determines whether there is an output increase request for the fuel cell 20 (step S2). If the result of the determination in one of steps S1 and S2 is negative, the control unit 60 ends the present control.

If the result of the determination in step S2 is affirmative, the control unit 60 sets a target current value corresponding to a target output value requested of the fuel cell 20 (step S3). The control unit 60 sets the target current value corresponding to the target output value on the IP curve E shown in FIG. 6. Incidentally, the IP curve E corresponds to an ideal IV curve C on which flooding does not occur in the high current region. FIG. 6 shows an example where the target current value is a target current value IA on the IP curve E with a target output value P1.

The control unit 60 starts increasing the output of the fuel cell 20 such that the output current value of the fuel cell 20 reaches the target current value (step S4). Subsequently, the control unit 60 determines whether the target current value is above the current threshold IKH (step S5). The current threshold IKH is stored in the ROM of the control unit 60 and set in the high current region. If the result of the determination is negative, the control unit 60 ends the present control. FIG. 5 shows an example where the target current value IA is above the current threshold IKH. Incidentally, the target current value is set in the high current region with the output current value of the fuel cell 20 in the low current region, for example, where the operation state of the fuel cell 20 shifts to the high current region within several seconds after the accelerator pedal 80 is depressed in an idling operation state, that is, where the vehicle is abruptly accelerated from the idling operation state.

If the result of the determination in step S5 is affirmative, the control unit 60 acquires an output voltage value of the fuel cell 20 in the low current region (step S6). The output voltage value of the fuel cell 20 where the output current value detected by the current sensor 2a has reached the current reference value IKL set in the low current region is acquired as the output voltage value in the low current region. The output starts to be increased after the target current value is set as described previously. Therefore, the output voltage value in the low current region is acquired within a short period after the target current value is set. FIG. 5 shows an example where an output voltage value V1 in the low current region is acquired, and an example where an output voltage value V2 that is larger than the output voltage value V1 is acquired. It should be noted herein that since the output voltage value in the low current region is an actually measured value as described above, the output voltage values V1 and V2 are not necessarily on the IV curves C1 and C2 respectively as shown in FIG. 5, but may be approximated.

Subsequently, the control unit 60 predicts, based on the acquired output voltage value in the low current region, whether the voltage drop (the third voltage drop) resulting from an increase in concentration overvoltage in the high current region occurs (step S7). If the acquired output voltage value is below a voltage threshold VK, it is estimated that the humidity state is good or that the humidity is low, and it is predicted that the voltage drop resulting from an increase in concentration overvoltage does not occur in the high current region. If the acquired output voltage value is above the voltage threshold VK, it is estimated that the humidity is high, and it is predicted in advance that the third voltage drop occurs in the high current region. This is because, as described previously, as the output voltage value in the low current region rises, the amount of moisture in the fuel cell 20 is considered to increase, and the voltage drop in the high current region is likely to increase. The occurrence of the third voltage drop can be predicted in advance by a simple method in which the output voltage value in the low current region and the voltage threshold VK are thus used. The voltage threshold VK is set in the low current region and stored in the ROM in advance. The voltage threshold VK is prescribed based on the IV curve C, and is a voltage value on the IV curve C at the current reference value IKL. However, the voltage threshold VK may be a value slightly larger than this voltage value. In this manner, the occurrence of the third voltage drop is predicted based on the output voltage value corresponding to a current value in the low current region that is larger than the output current value ID in an idling operation state. The reason for this is as follows. The difference in output voltage value is small and the accuracy of prediction may decrease in an idling operation state even when the humidity state is different. Besides, the occurrence of the third voltage drop can be predicted at an early stage before the output current value of the fuel cell 20 reaches at least the high current region, by predicting the occurrence of the third voltage drop based on the output voltage value in the low current region.

If it is predicted in step S7 that the third voltage drop in the high current region occurs, the control unit 60 executes a target current value resetting process for resetting the target current value to a current value that is smaller than the set target current value (step S8). In this manner, the occurrence of the voltage drop is predicted in advance, and the target current value is reset to a current value that is smaller than the target current value. Thus, the occurrence of the third voltage drop is suppressed in advance. Accordingly, the decrease in the output of the fuel cell 20 is also suppressed. Even if the operation state of the fuel cell 20 shifts from the low current region to the high current region in a short period, the decrease in the convergence performance of the output of the fuel cell 20 is suppressed.

Incidentally, in step S7, the occurrence or non-occurrence of the third voltage drop is predicted depending on whether the acquired output voltage value is above the voltage threshold VK, but embodiments of the invention are not limited thereto. For example, it is also appropriate to predict that the third voltage drop occurs, if the rate of decrease in output voltage value per increase in unit current in the low current region is smaller than a predetermined threshold. It is also appropriate to predict that the third voltage drop occurs, if the difference between a maximum value of the output voltage value and a minimum value of the output voltage value between a first predetermined current value and a second predetermined current value that is larger than the first predetermined current value is smaller than a predetermined threshold in the low current region. It is also appropriate to predict that the third voltage drop occurs, if a value obtained by integrating the output voltage value by the output current value between a third predetermined current value and a fourth predetermined current value that is larger than the third predetermined current value is larger than a predetermined threshold in the low current region.

In the aforementioned voltage drop suppression control, the processing of step S3 is an exemplary process executed by the setting unit that sets the target current value of the fuel cell 20 based on the output request for the fuel cell 20. The processing of step S4 is an exemplary process executed by the output control unit that controls the output current value of the fuel cell 20 from the low current region to the high current region in accordance with the target current value. The processing of step S7 is an exemplary process executed by the prediction unit that predicts that the third voltage drop of the fuel cell 20 occurs in the high current region, based on the output voltage value of the fuel cell 20 in the low current region, if the output current value of the fuel cell 20 is in the low current region and the target current value is above the current threshold set in the high current region. The processing of step S8 is an exemplary process executed by the resetting unit that resets the target current value to a current value that is smaller than the set target current value if it is predicted that the third voltage drop occurs.

Figure 7:
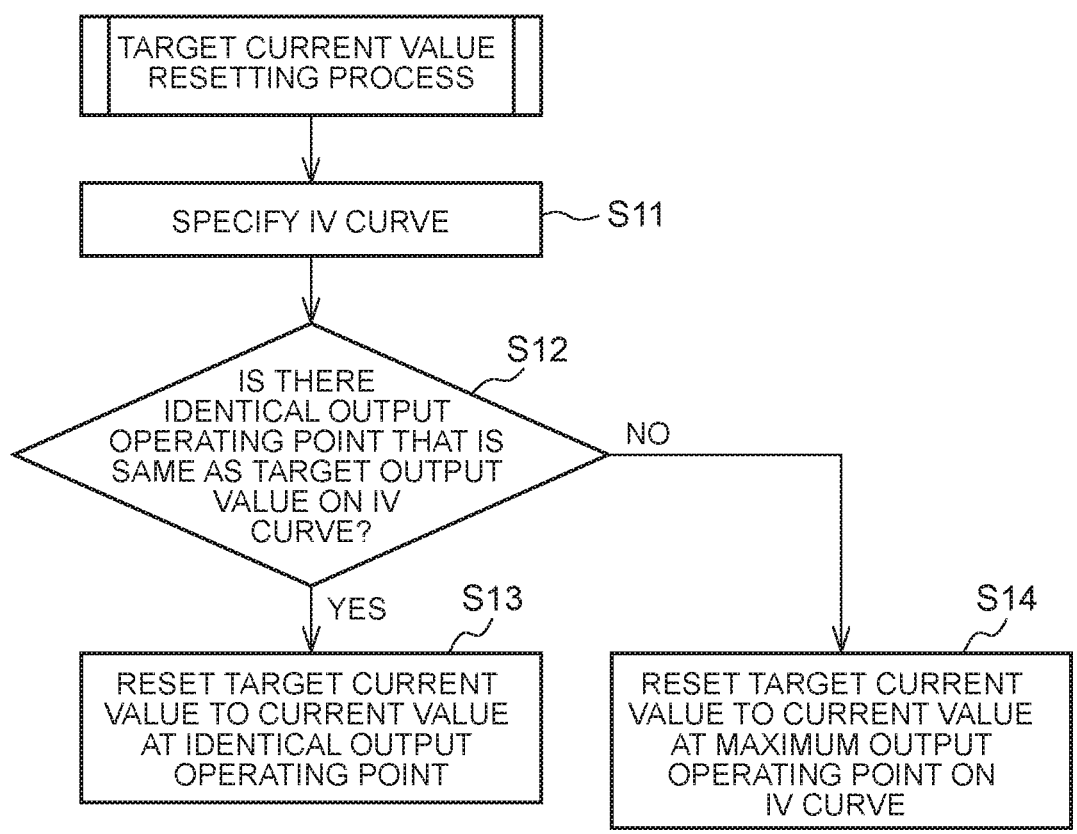
FIG. 7 is a flowchart showing an exemplary target current value resetting process.

Next, a target current value resetting process will be described. FIG. 7 is a flowchart showing an example of the target current value resetting process. The control unit 60 specifies one of the plurality of IV curves stored in the ROM as an IV characteristic at present, based on the acquired output voltage value of the fuel cell 20 in the low current region (step S11). Among the plurality of the IV curves, the IV curve closest to the acquired output voltage value of the fuel cell 20 in the low current region is specified. FIG. 5 shows an example where the IV curve C1 is specified if the output voltage value V1 is acquired, and the IV curve C2 is specified if the output voltage value V2 is acquired.

Subsequently, the control unit 60 determines whether there is an identical output operating point that is the same as the target output value on the specified IV curve (step S12). If the result of the determination is affirmative, the control unit 60 resets the target current value to a current value at the identical output operating point (step S13). Thus, the output of the fuel cell 20 can be secured while suppressing the third voltage drop. FIG. 5 shows an example in which the IV curve C1 is in contact with an iso-output curve D1 that extends past the target current value IA on the IV curve C. For example, if the IV curve C1 is specified in step S11, it is determined that there is an identical output operating point that is the same as the target output value on the IV curve C1, and the target current value IA is reset to the current value I1 at the identical output operating point on the IV curve C1. The current value I1 is smaller than the initially set target current value IA. Therefore, the output of the fuel cell 20 can be secured while suppressing the third voltage drop. FIG. 6 shows an example in which the target current value is reset to the target current value I1 on the IP curve E1 corresponding to the target output value P1. Incidentally, if there are two identical output operating points on the specified IV curve, the control unit 60 resets the target current value to the smaller one of the current values at the two identical output operating points. Thus, the output current value of the fuel cell 20 can be made to reach the target current value at an early stage.

If the result of the determination in step S12 is negative, the control unit 60 resets the target current value to a current value at a maximum output operating point at which the output on the specified IV curve is maximized (step S14). Thus, the decrease in the output of the fuel cell 20 can be suppressed to the minimum while suppressing the third voltage drop. FIG. 5 shows an example in which the IV curve C2 is in contact with an iso-output curve D2 that is smaller in output than the iso-output curve D1 instead of being in contact with the iso-output curve D1. For example, if the IV curve C2 is specified in step S11, it is determined that there is no identical output operating point on the IV curve C2, and the target current value IA is reset to a current value I2 at the maximum output operating point on the IV curve C2 past which the iso-output curve D2 extends. The current value I2 is smaller than the initially set target current value IA. Therefore, the decrease in the output of the fuel cell 20 can be suppressed to the minimum while suppressing the third voltage drop. FIG. 6 shows an example in which the target current value is reset to the current value I2 that is smaller than the initial target output value P1 but that corresponds to a maximum output value P2 on the IP curve E2. The decrease in the output of the fuel cell 20 is suppressed to the minimum by securing the maximum output on the IP curve E2.

Incidentally, as shown in FIG. 6, if the target output value P1 is requested, the aforementioned resetting is not carried out, the target current value is set based on the IP curve E, and the actual output of the fuel cell 20 shifts along the IP curve E1, the actual output value of the fuel cell 20 becomes a target output value P1' corresponding to the target current value IA on the IP curve E1, and decreases far below the target output value P1. By the same token, if the actual output of the fuel cell 20 shifts along the IP curve E2 as well, the actual output value of the fuel cell 20 becomes an output value limited to a design-based lower-limit voltage value that will be described later, and decreases far below the target output value P1.

Incidentally, embodiments of the invention are not limited to examples where the target current value is reset to the current value at the identical output operating point or the current value at the maximum output operating point on the specified IV curve. It is sufficient to reset the target current value to a current value that is smaller than the initial target current value. For example, the target current value may be reset to the same current value as the current threshold IKH, or may be reset to a current value that is smaller than the target current value. The target current value may be reset to a current value from the center of the intermediate current region to the high current region. This is because the third voltage drop in the high current region can be suppressed, and the output of the fuel cell 20 can be secured more often than if the third voltage drop occurs. Besides, the current threshold IKH may be set to a minimum current value in the high current region.

By the way, the continuous use of the fuel cell 20 may lead to, for example, changes in the catalysts and the electrolyte membranes over time, and the output voltage of the fuel cell 20 may decrease. After the performance has decreased, the IV characteristic and the IP characteristic deteriorate in all the operation states of the fuel cell 20. Thus, if the occurrence of the third voltage drop of the fuel cell 20 is predicted based on the aforementioned voltage threshold VK and the aforementioned current threshold IKH even after the decrease in performance, the voltage threshold VK and the current threshold IKH do not correspond to the fuel cell 20 after the decrease in performance. Therefore, the accuracy of prediction may decrease. Thus, the control unit 60 performs update control for updating information on the performance of the fuel cell 20 including the voltage threshold VK and the current threshold IKH.

Figure 8:
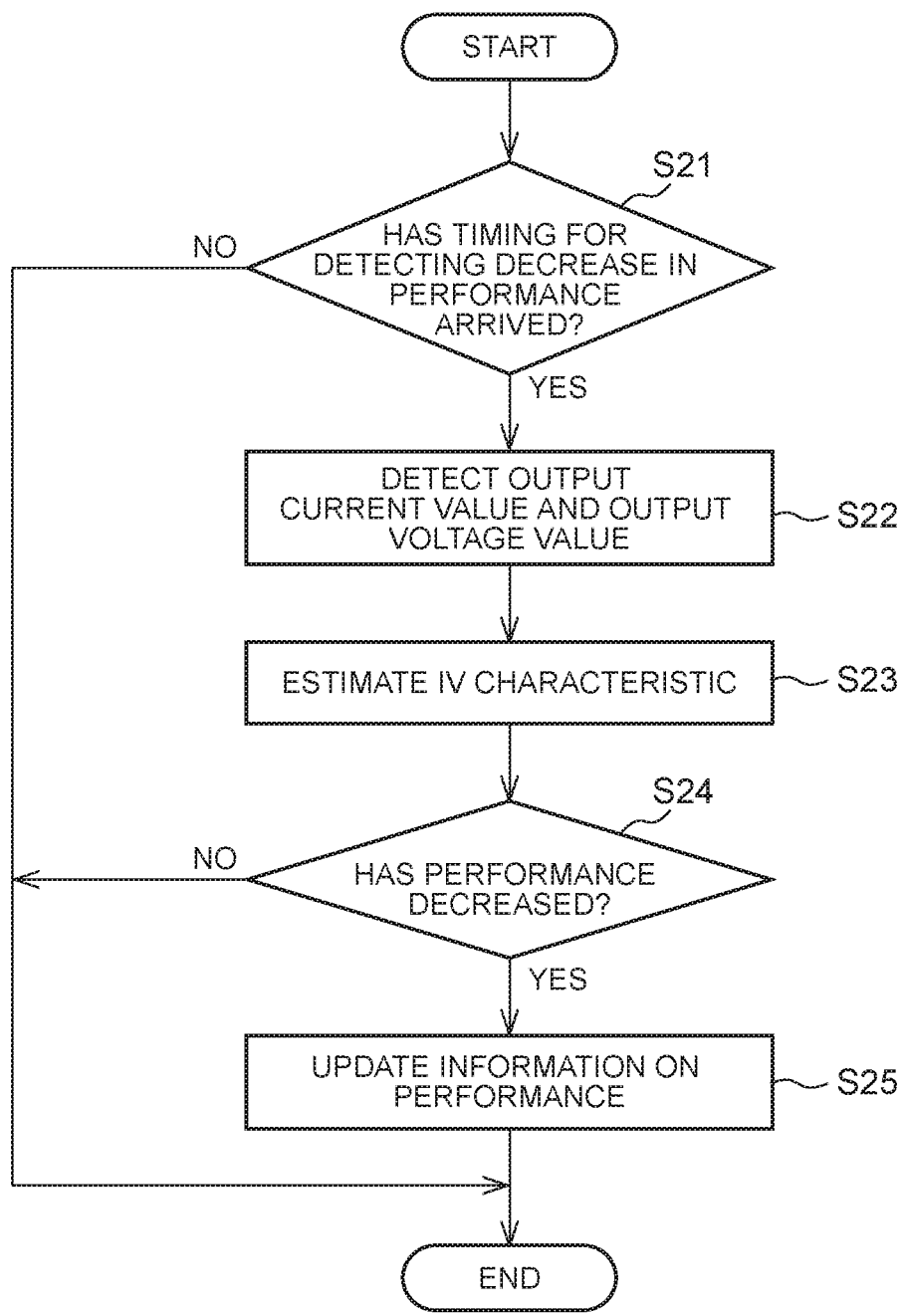
FIG. 8 is a flowchart showing an example of update control.
Figure 9:
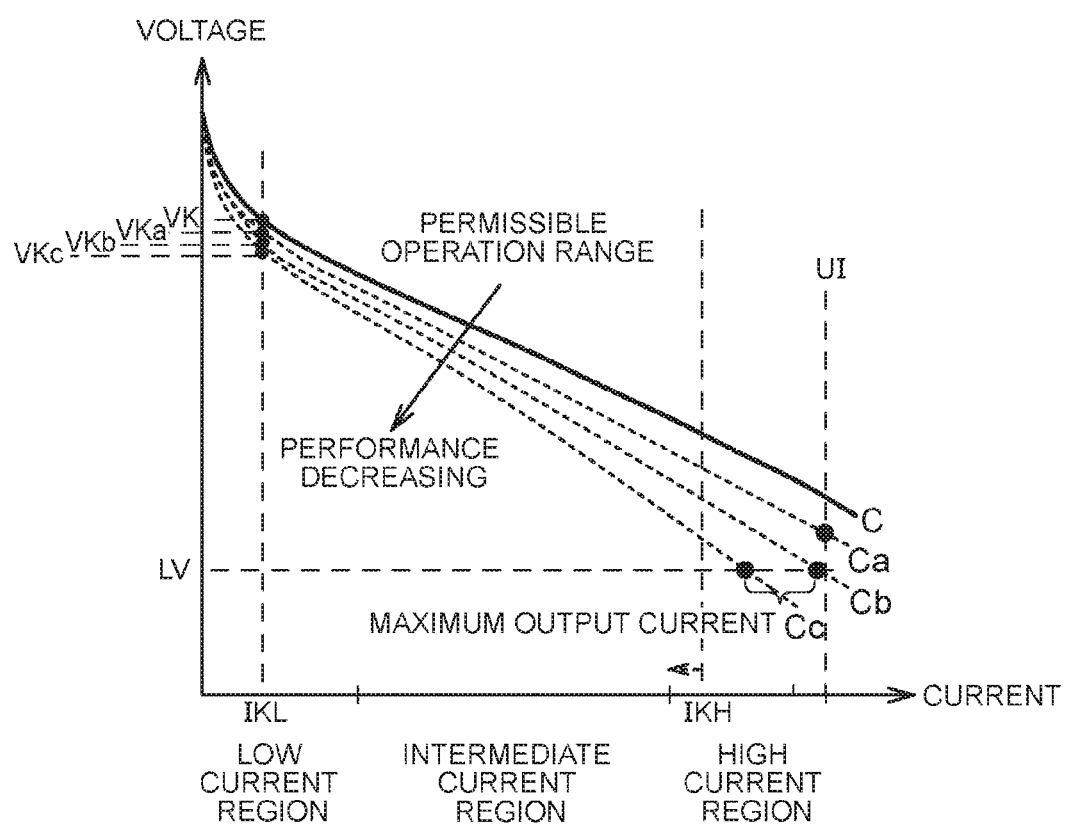
FIG. 9 is a map showing how a current-voltage characteristic curve changes as electric power generation performance of a fuel cell decreases.

Next, update control for updating information on the performance of the fuel cell 20 will be described. FIG. 8 is a flowchart showing an example of update control. FIGS. 9 and 10 are maps showing how the IV curve changes as the electric power generation performance of the fuel cell 20 decreases. FIG. 9 shows IV curves Ca, Cb and Cc corresponding to the IV curve C after the decrease in performance. FIG. 10 shows IV curves C1a, C1b and C1c corresponding to the IV curve C1 after the decrease in performance. Incidentally, FIG. 9 shows the voltage threshold VK and voltage thresholds VKa, VKb and VKc that are prescribed by the IV curves C to Cc respectively. As with the voltage threshold VK, the voltage thresholds VKa, VKb and VKc may be voltage values on the IV curves Ca to Cc respectively, or may be slightly larger than those voltage values respectively. The maps shown in FIGS. 9 and 10 are calculated in advance through an experiment to be stored into the ROM.

Update control is repeatedly performed at intervals of a predetermined time. First of all, the control unit 60 determines whether a timing for detecting a decrease in the performance of the fuel cell 20 has arrived (step S21). If the result of the determination is negative, the control unit 60 ends the present control. If the result of the determination is affirmative, the control unit 60 detects a plurality of output current values of the fuel cell 20, and a plurality of output voltage values corresponding to the plurality of the output current values respectively (step S22). The control unit 60 estimates an IV characteristic of the fuel cell 20 based on a result of detection (step S23). By comparing the estimated IV characteristic with the IV characteristic stored in advance in the ROM, the control unit 60 determines whether the performance of the fuel cell 20 has decreased (step S24). If the result of the determination is negative, the control unit 60 ends the present control.

If the result of the determination in step S24 is affirmative, the control unit 60 updates the information on performance stored in advance in the ROM before the decrease in performance to the information on performance after the decrease in performance, in accordance with the degree of decrease in the performance of the fuel cell 20 (step S25). The information on performance before the decrease in performance and the information on performance after the decrease in performance are calculated in advance through an experiment to be stored into the ROM. The information on performance includes the IV curve, the IP curve, the iso-output curve, the current threshold and the voltage threshold. The information on performance for each degree of decrease in performance is stored in the ROM. The IV curve, the IP curve, the iso-output curve, the current threshold and the voltage threshold are associated with one another.

For example, an IV characteristic where flooding does not occur in the high current region of the fuel cell 20 is estimated based on the plurality of the detected output current values and the plurality of the detected output voltage values. If the performance has not decreased, the estimated IV characteristic is substantially the same as the IV curve C stored in advance in the ROM. If the performance has decreased, the estimated IV characteristic is close to one of the IV curves Ca to Cc in the map of FIG. 9. For example, if the estimated IV characteristic is closest to the IV curve Ca, the IV curve C stored in the ROM is updated to the IV curve Ca. Simultaneously with this update, the IV curve C1 and the voltage threshold VK are updated to the IV curve C1a and the voltage threshold VKa that are associated with the IV curve Ca, respectively. Although not shown in FIG. 9, the current threshold IKH is updated to the current threshold that is associated with the IV curve Ca. Other IV curves, other IP curves and other iso-output curves are updated to other IV curves, other IP curves and other iso-output curves that are associated with the IV curve Ca, respectively. Incidentally, as the performance decreases, both the voltage threshold VK and the current threshold IKH are updated to smaller values.

As described above, the information on performance after the decrease in performance is updated, and the aforementioned voltage drop suppression control is performed based on the information on performance. Therefore, the voltage drop can be appropriately suppressed after the decrease in performance as well. Specifically, the IV curve, the voltage threshold and the current threshold are updated. Thus, after the decrease in performance as well, the occurrence of the voltage drop can be accurately predicted, and the voltage drop can be suppressed. Furthermore, by updating the iso-output curve, the decrease in the output of the fuel cell 20 in suppressing the voltage drop can be suppressed even after the decrease in performance.

Incidentally, in the aforementioned embodiment of the invention, both the voltage threshold VK and the current threshold IKH are updated as the performance decreases. However, only one of the voltage threshold VK and the current threshold IKH may be updated without updating the other. For example, if the degree of decrease in the voltage of the fuel cell 20 in the low current region is small and the degree of decrease in the voltage of the fuel cell 20 in the high current region is large as a result of a decrease in performance, only the current threshold IKH may be updated.

In the aforementioned update control, the processing of step S23 is an exemplary process executed by the characteristic estimation unit that estimates the current-voltage characteristic of the fuel cell 20. The processing of step S24 is an exemplary process executed by the determination unit that determines, based on the estimated current-voltage characteristic, whether the performance of the fuel cell 20 has decreased. The processing of step S25 is an exemplary process executed by the update unit that updates at least one of the current threshold and the voltage threshold, which are stored in the ROM, based on the estimated current-voltage characteristic, if it is determined that the performance of the fuel cell 20 has decreased.

Incidentally, as shown in FIGS. 9 and 10, a permissible operation range in which the operation of the fuel cell 20 is permitted is prescribed by a design-based upper-limit current value UI and a design-based lower-limit voltage value LV. This upper-limit current value UI and this lower-limit voltage value LV are prescribed in consideration of the securement of normal operation of the fuel cell system 10 side, and are different from a maximum current value and a minimum voltage value that can be theoretically output by the fuel cell 20, respectively. For example, the maximum current value of the fuel cell 20 in the permissible operation range is the upper-limit current value UI before the decrease in performance as indicated by the IV curve C in FIG. 9. If the degree of decrease in performance is small even after the decrease in performance as indicated by the IV curve Ca, the maximum current value of the fuel cell 20 in the permissible operation range is the upper-limit current value UI. However, after the performance has further decreased as indicated by the IV curves Cb and Cc, the maximum current value of the fuel cell 20 is below the upper-limit current value UI, and the voltage value at this time is the lower-limit voltage value LV. It should be noted herein that each of the IV curves C to Cc indicates an ideal IV curve on which the concentration overvoltage does not increase in the high current region as described previously, and is an IV curve on which the voltage value in the high current region is the largest in each performance state. Accordingly, in the present embodiment of the invention, "the entire current region" in which the fuel cell 20 can output current refers to an interval from a current value of zero to the smaller one of the upper-limit current value UI and the maximum current value that can be output by the fuel cell 20. In the present embodiment of the invention, the low current region, the intermediate current region and the high current region are defined according to the entire current region thus defined.

Although the preferred embodiment of the invention has been described hereinabove in detail, the invention should not be limited to this specific embodiment thereof, but can be modified or altered in various manners.

What is claimed is:

1. A fuel cell system comprising:
a fuel cell; and
a control unit that is configured to
set a target current value of the fuel cell based on an output request for the fuel cell,
predict that a voltage drop of the fuel cell occurs in a high current region of the fuel cell, based on an output voltage value of the fuel cell in a low current region of the fuel cell, if an output current value of the fuel cell is in the low current region and the target current value is above a current threshold that is set in the high current region,
reset the target current value to a current value that is smaller than the set target current value, if it is predicted that the voltage drop occurs, and
change the output current value of the fuel cell to the reset target current value.

2. The fuel cell system according to claim 1, wherein
the control unit predicts that the voltage drop occurs, if the output voltage value of the fuel cell at a predetermined current value in the low current region is above a voltage threshold.

3. The fuel cell system according to claim 2, wherein
the control unit includes a storage unit in which the current threshold and the voltage threshold are stored, and
is configured to
estimate a current-voltage characteristic of the fuel cell,
determine, based on the estimated current-voltage characteristic, whether a performance of the fuel cell has decreased, and
update at least one of the current threshold and the voltage threshold that are stored in the storage unit, based on the estimated current-voltage characteristic, if it is determined that the performance of the fuel cell has decreased.

* * * * *